UNITED STATES PATENT OFFICE.

HUGO HAMMAR, OF DELHI, NEW YORK.

FLUX FOR ALUMINUM-SOLDER.

1,083,828.      Specification of Letters Patent.      Patented Jan. 6, 1914.

No Drawing.      Application filed Janu.. 1913. Serial No. 741,901.

*To all whom it may concern:*

Be it known that I, HUGO HAMMAR, formerly a resident of Finland, and a subject of the Czar of Russia, and now a permanent resident of the United States, a resident of Delhi, in the county of Delaware and State of New York, have invented a new and Improved Flux for Aluminum-Solder, of which the following is a full, clear, and exact description.

My invention has for its object to provide a flux for aluminum solder consisting of soft soap and beeswax which may be easily manufactured and may be used with a blow pipe with my aluminum solder.

Various solders for aluminum have been provided, but it has been impossible to make use of any of them, with a blow pipe, or with great heat, and there are, therefore, many objections to their use. This is so for in the rapid manufacture of articles which are constructed of aluminum, and as the manufacture is carried on at most establishments, it is necessary to make use of a blow pipe to do the work economically; too much time is required when the soldering is done with a soldering iron or by rubbing and sticking the parts together.

My solder is composed of tin, and commercial zinc, the composition of which is substantially as follows: lead 0.18%, copper 0.30, iron 0.17, zinc 99.35. The t.. ..u zinc, which are provided in equal amounts, by weight, are melted, and the alloy is used as a solder with a blow pipe in the customary manner. With this solder I use a flux made as follows: wood ashes and water are boiled together for a few hours, after which grease or fat, preferably tallow, is mixed therewith, making a soft soap. With this soft soap I mix beeswax in about the proportion of four parts beeswax to one part of soft soap. This flux should be used to obtain the best results with this solder. The soft soap and beeswax are boiled when being mixed.

Having thus described my invention, I claim as new and desire to secure by Letters Patent:

1. In a flux, soft soap and wax.
2. In a flux, soft soap and beeswax.
3. In a flux, soft soap and wax in substantially the proportion of one part soft soap to four parts wax.

In testimony whereof, I have signed my name to this specification in the presence of two subscribing witnesses.

HUGO HAMMAR.

Witnesses:
    EVERARD B. MARSHALL,
    JOHN P. DAVIS.